(12) United States Patent
Anseth et al.

(10) Patent No.: US 11,422,427 B2
(45) Date of Patent: Aug. 23, 2022

(54) APPLICATIONS OF ELECTRO-OPTIC DISPLAYS

(71) Applicant: E Ink Corporation, Billerica, MA (US)

(72) Inventors: Jay William Anseth, Canton, MA (US); Richard J. Paolini, Jr., Framingham, MA (US); Stephen J. Telfer, Arlington, MA (US); Yelena Kann, Marblehead, MA (US); Thomas S. Blaine, Haverhill, MA (US); Nishit Murari, Billerica, MA (US)

(73) Assignee: E Ink Corporation, Billerica, MA (US)

( * ) Notice: Subject to any disclaimer, the term of this patent is extended or adjusted under 35 U.S.C. 154(b) by 500 days.

(21) Appl. No.: 16/224,896

(22) Filed: Dec. 19, 2018

(65) Prior Publication Data
US 2019/0187533 A1 Jun. 20, 2019

Related U.S. Application Data (60) Provisional application No. 62/607,377, filed on Dec. 19, 2017.

(51) Int. Cl.
*G02F 1/167* (2019.01)
*G02F 1/1676* (2019.01)
(Continued)

(52) U.S. Cl.
CPC ............ *G02F 1/167* (2013.01); *G02F 1/0126* (2013.01); *G02F 1/1676* (2019.01); *G03B 21/56* (2013.01); *G02F 2201/50* (2013.01)

(58) Field of Classification Search
None
See application file for complete search history.

(56) References Cited

U.S. PATENT DOCUMENTS 3,932,025 A   1/1976   Lakatos et al.
4,418,346 A   11/1983   Batchelder
(Continued)

FOREIGN PATENT DOCUMENTS

CN   102253502 A   11/2011
JP   H1185064 A   3/1999
(Continued)

OTHER PUBLICATIONS

O'Regan, B. et al., "A Low Cost, High-efficiency Solar Cell Based on Dye-sensitized colloidal TiO2 Films", Nature, vol. 353, pp. 737-740 (Oct. 24, 1991). Oct. 24, 1991.
(Continued)

*Primary Examiner* — Christopher Stanford
*Assistant Examiner* — Journey F Sumlar
(74) *Attorney, Agent, or Firm* — David J. Cole (57) ABSTRACT

An image is formed on an architectural surface by applying to the surface, in order: a rear electrode layer; a light-transmissive front electrode layer; a photoconductive layer disposed between the front and rear electrode layers; and an electro-optic layer disposed between the front and rear electrode layers. A potential difference is applied between the front and rear electrode layers and the front electrode layer is imagewise exposed to radiation which causes a change in the conductivity of the photoconductive layer, thereby causing an imagewise change in the optical state of the electro-optic layer. Films for application to architectural surfaces are also provided.

7 Claims, 5 Drawing Sheets

(51) Int. Cl.
  *G03B 21/56* (2006.01)
  *G02F 1/01* (2006.01)

(56) References Cited

U.S. PATENT DOCUMENTS

| | | |
|---|---|---|
| 5,760,761 A | 6/1998 | Sheridon |
| 5,777,782 A | 7/1998 | Sheridon |
| 5,808,783 A | 9/1998 | Crowley |
| 5,872,552 A | 2/1999 | Gordon, II et al. |
| 5,930,026 A | 7/1999 | Jacobson et al. |
| 6,017,584 A | 1/2000 | Albert et al. |
| 6,054,071 A | 4/2000 | Mikkelsen, Jr. |
| 6,055,091 A | 4/2000 | Sheridon et al. |
| 6,097,531 A | 8/2000 | Sheridon |
| 6,118,426 A | 9/2000 | Albert et al. |
| 6,128,124 A | 10/2000 | Silverman |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,172,798 B1 | 1/2001 | Albert et al. |
| 6,184,856 B1 | 2/2001 | Gordon, II et al. |
| 6,225,971 B1 | 5/2001 | Gordon, II et al. |
| 6,241,921 B1 | 6/2001 | Jacobson et al. |
| 6,271,823 B1 | 8/2001 | Gordon, II et al. |
| 6,301,038 B1 | 10/2001 | Fitzmaurice et al. |
| 6,445,489 B1 | 9/2002 | Jacobson et al. |
| 6,473,072 B1 | 10/2002 | Comiskey et al. |
| 6,504,524 B1 | 1/2003 | Gates et al. |
| 6,512,354 B2 | 1/2003 | Jacobson et al. |
| 6,531,997 B1 | 3/2003 | Gates et al. |
| 6,545,797 B2 | 4/2003 | Chen et al. |
| 6,664,944 B1 | 12/2003 | Albert et al. |
| 6,704,133 B2 | 3/2004 | Gates et al. |
| 6,710,540 B1 | 3/2004 | Albert et al. |
| 6,738,050 B2 | 5/2004 | Comiskey et al. |
| 6,753,999 B2 | 6/2004 | Zehner et al. |
| 6,784,953 B2 | 8/2004 | Liang et al. |
| 6,788,452 B2 | 9/2004 | Liang et al. |
| 6,825,829 B1 | 11/2004 | Albert et al. |
| 6,825,970 B2 | 11/2004 | Goenaga et al. |
| 6,864,875 B2 | 3/2005 | Drzaic |
| 6,866,760 B2 | 3/2005 | Paolini, Jr. et al. |
| 6,870,657 B1 | 3/2005 | Fitzmaurice et al. |
| 6,900,851 B2 | 5/2005 | Morrison et al. |
| 6,914,714 B2 | 7/2005 | Chen et al. |
| 6,922,276 B2 | 7/2005 | Zhang et al. |
| 6,950,220 B2 | 9/2005 | Abramson et al. |
| 6,972,893 B2 | 12/2005 | Chen et al. |
| 6,982,178 B2 | 1/2006 | LeCain et al. |
| 6,995,550 B2 | 2/2006 | Jacobson et al. |
| 7,002,728 B2 | 2/2006 | Pullen et al. |
| 7,012,600 B2 | 3/2006 | Zehner et al. |
| 7,012,735 B2 | 3/2006 | Honeyman et al. |
| 7,023,420 B2 | 4/2006 | Comiskey et al. |
| 7,030,854 B2 | 4/2006 | Baucom et al. |
| 7,034,783 B2 | 4/2006 | Gates et al. |
| 7,038,656 B2 | 5/2006 | Liang et al. |
| 7,038,670 B2 | 5/2006 | Liang et al. |
| 7,046,228 B2 | 5/2006 | Liang et al. |
| 7,052,571 B2 | 5/2006 | Wang et al. |
| 7,061,166 B2 | 6/2006 | Kuniyasu |
| 7,061,662 B2 | 6/2006 | Chung et al. |
| 7,072,095 B2 | 7/2006 | Liang et al. |
| 7,075,502 B1 | 7/2006 | Drzaic et al. |
| 7,112,114 B2 | 9/2006 | Liang et al. |
| 7,116,318 B2 | 10/2006 | Amundson et al. |
| 7,116,466 B2 | 10/2006 | Whitesides et al. |
| 7,119,759 B2 | 10/2006 | Zehner et al. |
| 7,119,772 B2 | 10/2006 | Amundson et al. |
| 7,144,942 B2 | 12/2006 | Zang et al. |
| 7,158,282 B2 | 1/2007 | Liang et al. |
| 7,167,155 B1 | 1/2007 | Albert et al. |
| 7,170,670 B2 | 1/2007 | Webber |
| 7,177,066 B2 | 2/2007 | Chung et al. |
| 7,193,625 B2 | 3/2007 | Danner et al. |
| 7,202,847 B2 | 4/2007 | Gates |
| 7,206,119 B2 | 4/2007 | Honeyman et al. |
| 7,236,291 B2 | 6/2007 | Kaga et al. |
| 7,236,292 B2 | 6/2007 | LeCain |
| 7,242,514 B2 | 7/2007 | Chung et al. |
| 7,259,744 B2 | 8/2007 | Arango et al. |
| 7,304,787 B2 | 12/2007 | Whitesides et al. |
| 7,312,784 B2 | 12/2007 | Baucom et al. |
| 7,312,794 B2 | 12/2007 | Zehner et al. |
| 7,321,459 B2 | 1/2008 | Masuda et al. |
| 7,327,511 B2 | 2/2008 | Whitesides et al. |
| 7,339,715 B2 | 3/2008 | Webber et al. |
| 7,385,751 B2 | 6/2008 | Chen et al. |
| 7,408,699 B2 | 8/2008 | Wang et al. |
| 7,411,719 B2 | 8/2008 | Paolini, Jr. et al. |
| 7,420,549 B2 | 9/2008 | Jacobson et al. |
| 7,443,571 B2 | 10/2008 | LeCain et al. |
| 7,453,445 B2 | 11/2008 | Amundson |
| 7,492,339 B2 | 2/2009 | Amundson |
| 7,492,505 B2 | 2/2009 | Liang et al. |
| 7,513,813 B2 | 4/2009 | Paolini, Jr. et al. |
| 7,528,822 B2 | 5/2009 | Amundson et al. |
| 7,535,624 B2 | 5/2009 | Amundson et al. |
| 7,545,358 B2 | 6/2009 | Gates et al. |
| 7,561,324 B2 | 7/2009 | Duthaler et al. |
| 7,583,251 B2 | 9/2009 | Arango et al. |
| 7,602,374 B2 | 10/2009 | Zehner et al. |
| 7,612,760 B2 | 11/2009 | Kawai |
| 7,615,325 B2 | 11/2009 | Liang et al. |
| 7,636,191 B2 | 12/2009 | Duthaler |
| 7,649,666 B2 | 1/2010 | Isobe et al. |
| 7,667,684 B2 | 2/2010 | Jacobson et al. |
| 7,679,599 B2 | 3/2010 | Kawai |
| 7,679,813 B2 | 3/2010 | Liang et al. |
| 7,679,814 B2 | 3/2010 | Paolini, Jr. et al. |
| 7,683,606 B2 | 3/2010 | Kang et al. |
| 7,684,108 B2 | 3/2010 | Wang et al. |
| 7,688,297 B2 | 3/2010 | Zehner et al. |
| 7,705,824 B2 | 4/2010 | Baucom et al. |
| 7,715,088 B2 | 5/2010 | Liang et al. |
| 7,728,811 B2 | 6/2010 | Albert et al. |
| 7,729,039 B2 | 6/2010 | LeCain et al. |
| 7,733,311 B2 | 6/2010 | Amundson et al. |
| 7,733,335 B2 | 6/2010 | Zehner et al. |
| 7,787,169 B2 | 8/2010 | Abramson et al. |
| 7,791,782 B2 | 9/2010 | Paolini, Jr. et al. |
| 7,791,789 B2 | 9/2010 | Albert et al. |
| 7,800,813 B2 | 9/2010 | Wu et al. |
| 7,821,702 B2 | 10/2010 | Liang et al. |
| 7,826,129 B2 | 11/2010 | Wu et al. |
| 7,839,564 B2 | 11/2010 | Whitesides et al. |
| 7,843,621 B2 | 11/2010 | Danner et al. |
| 7,843,624 B2 | 11/2010 | Danner et al. |
| 7,859,742 B1 | 12/2010 | Chiu et al. |
| 7,910,175 B2 | 3/2011 | Webber |
| 7,952,557 B2 | 5/2011 | Amundson et al. |
| 7,952,790 B2 | 5/2011 | Honeyman et al. |
| 7,956,841 B2 | 6/2011 | Albert et al. |
| 7,982,479 B2 | 7/2011 | Wang et al. |
| 7,982,941 B2 | 7/2011 | Lin et al. |
| 7,990,600 B2 | 8/2011 | Sachs et al. |
| 7,999,787 B2 | 8/2011 | Amundson et al. |
| 8,009,348 B2 | 8/2011 | Zehner et al. |
| 8,011,592 B2 | 9/2011 | Wang |
| 8,034,209 B2 | 10/2011 | Danner et al. |
| 8,040,594 B2 | 10/2011 | Paolini, Jr. et al. |
| 8,054,526 B2 | 11/2011 | Bouchard |
| 8,064,962 B2 | 11/2011 | Wilcox et al. |
| 8,068,272 B2 | 11/2011 | LeCain et al. |
| 8,077,141 B2 | 12/2011 | Duthaler et al. |
| 8,077,381 B2 | 12/2011 | LeCain et al. |
| 8,098,418 B2 | 1/2012 | Paolini, Jr. et al. |
| 8,125,501 B2 | 2/2012 | Amundson et al. |
| 8,139,050 B2 | 3/2012 | Jacobson et al. |
| 8,159,636 B2 | 4/2012 | Sun et al. |
| 8,162,212 B2 | 4/2012 | Chung et al. |
| 8,174,490 B2 | 5/2012 | Whitesides et al. |
| 8,177,942 B2 | 5/2012 | Paolini, Jr. et al. |

(56) References Cited

U.S. PATENT DOCUMENTS

| | | |
|---|---|---|
| 8,213,076 B2 | 7/2012 | Albert et al. |
| 8,243,013 B1 | 8/2012 | Sprague et al. |
| 8,274,472 B1 | 9/2012 | Wang et al. |
| 8,289,250 B2 | 10/2012 | Zehner et al. |
| 8,300,006 B2 | 10/2012 | Zhou et al. |
| 8,305,341 B2 | 11/2012 | Arango et al. |
| 8,314,784 B2 | 11/2012 | Ohkami et al. |
| 8,363,299 B2 | 1/2013 | Paolini, Jr. et al. |
| 8,373,649 B2 | 2/2013 | Low et al. |
| 8,384,658 B2 | 2/2013 | Albert et al. |
| 8,390,301 B2 | 3/2013 | Danner et al. |
| 8,422,116 B2 | 4/2013 | Sprague et al. |
| 8,441,714 B2 | 5/2013 | Paolini, Jr. et al. |
| 8,441,716 B2 | 5/2013 | Paolini, Jr. et al. |
| 8,456,414 B2 | 6/2013 | Lin et al. |
| 8,462,102 B2 | 6/2013 | Wong et al. |
| 8,466,852 B2 | 6/2013 | Drzaic et al. |
| 8,482,835 B2 | 7/2013 | LeCain |
| 8,503,063 B2 | 8/2013 | Sprague |
| 8,514,168 B2 | 8/2013 | Chung et al. |
| 8,537,105 B2 | 9/2013 | Chiu et al. |
| 8,553,012 B2 | 10/2013 | Baucom et al. |
| 8,558,783 B2 | 10/2013 | Wilcox et al. |
| 8,558,785 B2 | 10/2013 | Zehner et al. |
| 8,558,786 B2 | 10/2013 | Lin |
| 8,558,855 B2 | 10/2013 | Sprague et al. |
| 8,576,164 B2 | 11/2013 | Sprague et al. |
| 8,576,259 B2 | 11/2013 | Lin et al. |
| 8,576,470 B2 | 11/2013 | Paolini, Jr. et al. |
| 8,576,475 B2 | 11/2013 | Huang et al. |
| 8,593,396 B2 | 11/2013 | Amundson et al. |
| 8,593,721 B2 | 11/2013 | Albert et al. |
| 8,605,032 B2 | 12/2013 | Liu et al. |
| 8,605,354 B2 | 12/2013 | Zhang et al. |
| 8,643,595 B2 | 2/2014 | Chung et al. |
| 8,649,084 B2 | 2/2014 | Wang et al. |
| 8,665,206 B2 | 3/2014 | Lin et al. |
| 8,670,174 B2 | 3/2014 | Sprague et al. |
| 8,681,191 B2 | 3/2014 | Yang et al. |
| 8,704,756 B2 | 4/2014 | Lin |
| 8,717,664 B2 | 5/2014 | Wang et al. |
| 8,730,153 B2 | 5/2014 | Sprague et al. |
| 8,786,929 B2 | 7/2014 | LeCain et al. |
| 8,786,935 B2 | 7/2014 | Sprague |
| 8,797,634 B2 | 8/2014 | Paolini, Jr. et al. |
| 8,810,525 B2 | 8/2014 | Sprague |
| 8,810,899 B2 | 8/2014 | Sprague et al. |
| 8,830,553 B2 | 9/2014 | Patry et al. |
| 8,830,559 B2 | 9/2014 | Honeyman et al. |
| 8,854,721 B2 | 10/2014 | Danner et al. |
| 8,873,129 B2 | 10/2014 | Paolini, Jr. et al. |
| 8,902,153 B2 | 12/2014 | Bouchard et al. |
| 8,902,491 B2 | 12/2014 | Wang et al. |
| 8,917,439 B2 | 12/2014 | Wang et al. |
| 8,928,562 B2 | 1/2015 | Gates et al. |
| 8,928,641 B2 | 1/2015 | Chiu et al. |
| 8,964,282 B2 | 2/2015 | Wang et al. |
| 8,973,837 B2 | 3/2015 | Tsai et al. |
| 8,976,444 B2 | 3/2015 | Zhang et al. |
| 9,013,394 B2 | 4/2015 | Lin |
| 9,013,783 B2 | 4/2015 | Sprague |
| 9,019,197 B2 | 4/2015 | Lin |
| 9,019,198 B2 | 4/2015 | Lin et al. |
| 9,019,318 B2 | 4/2015 | Sprague et al. |
| 9,075,280 B2 | 7/2015 | Whitesides |
| 9,082,352 B2 | 7/2015 | Cheng et al. |
| 9,116,412 B2 | 8/2015 | Lin |
| 9,146,439 B2 | 9/2015 | Zhang |
| 9,164,207 B2 | 10/2015 | Honeyman et al. |
| 9,170,467 B2 | 10/2015 | Whitesides et al. |
| 9,170,468 B2 | 10/2015 | Lin et al. |
| 9,171,508 B2 | 10/2015 | Sprague et al. |
| 9,182,646 B2 | 11/2015 | Paolini, Jr. et al. |
| 9,188,829 B2 | 11/2015 | Li et al. |
| 9,195,111 B2 | 11/2015 | Anseth et al. |
| 9,197,704 B2 | 11/2015 | Sun et al. |
| 9,199,441 B2 | 12/2015 | Danner |
| 9,218,773 B2 | 12/2015 | Sun et al. |
| 9,224,338 B2 | 12/2015 | Chan et al. |
| 9,224,342 B2 | 12/2015 | Sprague et al. |
| 9,224,344 B2 | 12/2015 | Chung et al. |
| 9,230,492 B2 | 1/2016 | Harrington et al. |
| 9,238,340 B2 | 1/2016 | Kayal et al. |
| 9,251,736 B2 | 2/2016 | Lin et al. |
| 9,262,973 B2 | 2/2016 | Wu et al. |
| 9,268,191 B2 | 2/2016 | Paolini, Jr. et al. |
| 9,269,311 B2 | 2/2016 | Amundson |
| 9,279,906 B2 | 3/2016 | Kang |
| 9,285,649 B2 | 3/2016 | Du et al. |
| 9,293,511 B2 | 3/2016 | Jacobson et al. |
| 9,299,294 B2 | 3/2016 | Lin et al. |
| 9,341,916 B2 | 5/2016 | Telfer et al. |
| 9,360,733 B2 | 6/2016 | Wang et al. |
| 9,361,836 B1 | 6/2016 | Telfer et al. |
| 9,373,289 B2 | 6/2016 | Sprague et al. |
| 9,383,623 B2 | 7/2016 | Lin et al. |
| 9,390,066 B2 | 7/2016 | Smith et al. |
| 9,390,661 B2 | 7/2016 | Chiu et al. |
| 9,412,314 B2 | 8/2016 | Amundson et al. |
| 9,423,666 B2 | 8/2016 | Wang et al. |
| 9,459,510 B2 | 10/2016 | Lin |
| 9,460,666 B2 | 10/2016 | Sprague et al. |
| 9,491,879 B2 | 11/2016 | Cheng et al. |
| 9,495,918 B2 | 11/2016 | Harrington et al. |
| 9,501,981 B2 | 11/2016 | Lin et al. |
| 9,513,527 B2 | 12/2016 | Chan et al. |
| 9,513,743 B2 | 12/2016 | Sjodin et al. |
| 9,514,667 B2 | 12/2016 | Lin |
| 9,541,814 B2 | 1/2017 | Lin et al. |
| 9,542,895 B2 | 1/2017 | Gates et al. |
| 9,554,495 B2 | 1/2017 | Danner et al. |
| 9,564,088 B2 | 2/2017 | Wilcox et al. |
| 9,612,502 B2 | 4/2017 | Danner et al. |
| 9,620,048 B2 | 4/2017 | Sim et al. |
| 9,620,067 B2 | 4/2017 | Harrington et al. |
| 9,671,668 B2 | 6/2017 | Chan et al. |
| 9,672,766 B2 | 6/2017 | Sjodin |
| 9,691,333 B2 | 6/2017 | Cheng et al. |
| 9,697,778 B2 | 7/2017 | Telfer |
| 9,721,495 B2 | 8/2017 | Harrington et al. |
| 9,733,540 B2 | 8/2017 | LeCain et al. |
| 9,740,076 B2 | 8/2017 | Paolini et al. |
| 9,759,980 B2 | 9/2017 | Du et al. |
| 9,792,861 B2 | 10/2017 | Chang et al. |
| 9,792,862 B2 | 10/2017 | Hung et al. |
| 9,812,073 B2 | 11/2017 | Lin et al. |
| 9,966,018 B2 | 5/2018 | Gates et al. |
| 2002/0057250 A1 | 5/2002 | Michaelis |
| 2002/0090980 A1 | 7/2002 | Wilcox et al. |
| 2003/0102858 A1 | 6/2003 | Jacobson et al. |
| 2004/0119681 A1 | 6/2004 | Albert et al. |
| 2004/0246562 A1 | 12/2004 | Chung et al. |
| 2005/0253777 A1 | 11/2005 | Zehner et al. |
| 2006/0145620 A1* | 7/2006 | Mun .................. H01J 11/12 313/610 |
| 2007/0091418 A1 | 4/2007 | Danner et al. |
| 2007/0103427 A1 | 5/2007 | Zhou et al. |
| 2007/0176912 A1 | 8/2007 | Beames et al. |
| 2007/0237962 A1 | 10/2007 | Liang et al. |
| 2007/0285385 A1 | 12/2007 | Albert et al. |
| 2008/0024429 A1 | 1/2008 | Zehner |
| 2008/0024482 A1 | 1/2008 | Gates et al. |
| 2008/0043318 A1 | 2/2008 | Whitesides et al. |
| 2008/0048970 A1 | 2/2008 | Drzaic et al. |
| 2008/0136774 A1 | 6/2008 | Harris et al. |
| 2008/0291129 A1 | 11/2008 | Harris et al. |
| 2008/0303780 A1 | 12/2008 | Sprague et al. |
| 2009/0168067 A1 | 7/2009 | LeCain et al. |
| 2009/0174651 A1 | 7/2009 | Jacobson et al. |
| 2009/0225398 A1 | 9/2009 | Duthaler et al. |
| 2009/0322721 A1 | 12/2009 | Zehner et al. |
| 2010/0156780 A1 | 6/2010 | Jacobson et al. |
| 2010/0194733 A1 | 8/2010 | Lin et al. |
| 2010/0194789 A1 | 8/2010 | Lin et al. |

(56) References Cited

U.S. PATENT DOCUMENTS

| | | |
|---|---|---|
| 2010/0220121 A1 | 9/2010 | Zehner et al. |
| 2010/0265561 A1 | 10/2010 | Gates et al. |
| 2010/0302284 A1 | 12/2010 | Karaki |
| 2011/0043543 A1 | 2/2011 | Chen et al. |
| 2011/0063314 A1 | 3/2011 | Chiu et al. |
| 2011/0164301 A1 | 7/2011 | Paolini, Jr. et al. |
| 2011/0175875 A1 | 7/2011 | Lin et al. |
| 2011/0193840 A1 | 8/2011 | Amundson et al. |
| 2011/0193841 A1 | 8/2011 | Amundson et al. |
| 2011/0199671 A1 | 8/2011 | Amundson et al. |
| 2011/0221740 A1 | 9/2011 | Yang et al. |
| 2012/0001957 A1 | 1/2012 | Liu et al. |
| 2012/0098740 A1 | 4/2012 | Chiu et al. |
| 2012/0326957 A1 | 12/2012 | Drzaic et al. |
| 2013/0063333 A1 | 3/2013 | Arango et al. |
| 2013/0176288 A1 | 7/2013 | Hung et al. |
| 2013/0194250 A1 | 8/2013 | Amundson et al. |
| 2013/0221112 A1 | 8/2013 | Lai et al. |
| 2013/0242378 A1 | 9/2013 | Paolini, Jr. et al. |
| 2013/0249782 A1 | 9/2013 | Wu et al. |
| 2013/0278995 A1 | 10/2013 | Drzaic et al. |
| 2014/0009817 A1 | 1/2014 | Wilcox et al. |
| 2014/0049808 A1 | 2/2014 | Yang |
| 2014/0055840 A1 | 2/2014 | Zang et al. |
| 2014/0062391 A1 | 3/2014 | Hsieh et al. |
| 2014/0078576 A1 | 3/2014 | Sprague |
| 2014/0204012 A1 | 7/2014 | Wu et al. |
| 2014/0206292 A1 | 7/2014 | Hung et al. |
| 2014/0240210 A1 | 8/2014 | Wu et al. |
| 2014/0253425 A1 | 9/2014 | Zalesky et al. |
| 2014/0293398 A1 | 10/2014 | Wang et al. |
| 2014/0362213 A1 | 12/2014 | Tseng |
| 2015/0005720 A1 | 1/2015 | Zang |
| 2015/0097877 A1 | 4/2015 | Lin et al. |
| 2015/0103394 A1 | 4/2015 | Wang et al. |
| 2015/0118390 A1 | 4/2015 | Rosenfeld et al. |
| 2015/0124345 A1 | 5/2015 | Rosenfeld et al. |
| 2015/0262255 A1 | 9/2015 | Khajehnouri et al. |
| 2015/0262551 A1 | 9/2015 | Zehner et al. |
| 2015/0268531 A1 | 9/2015 | Wang et al. |
| 2015/0277160 A1 | 10/2015 | Laxton |
| 2015/0301246 A1 | 10/2015 | Zang et al. |
| 2016/0012710 A1 | 1/2016 | Lu et al. |
| 2016/0026062 A1 | 1/2016 | Zhang |
| 2016/0035291 A1 | 2/2016 | Hung |
| 2016/0048054 A1 | 2/2016 | Danner |
| 2016/0093253 A1 | 3/2016 | Yang et al. |
| 2016/0140910 A1 | 5/2016 | Amundson |
| 2016/0180777 A1 | 6/2016 | Lin et al. |
| 2016/0232835 A1 | 8/2016 | Paolini, Jr. et al. |
| 2016/0259225 A1 | 9/2016 | Paolini, Jr. et al. |
| 2018/0136532 A1 | 5/2018 | Paolini et al. |

FOREIGN PATENT DOCUMENTS

| | | | |
|---|---|---|---|
| JP | 2002236471 A | 8/2002 | |
| JP | 2003315847 A | 11/2003 | |
| JP | 2005325677 A | 11/2005 | |
| JP | 2007047446 A | 2/2007 | |
| WO | 2000036560 A1 | 6/2000 | |
| WO | WO-2004017135 A2 * | 2/2004 | ............ G02F 1/167 |
| WO | 2017204328 A1 | 11/2017 | |

OTHER PUBLICATIONS

Wood, D., "An Electrochromic Renaissance?" Information Display, 18(3), 24 (Mar. 2002) Mar. 1, 2002.

Bach, U. et al., "Nanomaterials-Based Electrochromics for Paper-Quality Displays", Adv. Mater, vol. 14, No. 11, pp. 845-848 (Jun. 2002). Jun. 5, 2002.

Hayes, R.A. et al., "Video-Speed Electronic Paper Based on Electrowetting", Nature, vol. 425, No. 25, pp. 383-385 (Sep. 2003).

Kitamura, T. et al., "Electrical toner movement for electronic paper-like display", Asia Display/IDW '01, pp. 1517-1520, Paper HCS1-1 (2001).

Yamaguchi, Y. et al., "Toner display using insulative particles charged triboelectrically", Asia Display/IDW '01, pp. 1729-1730, Paper AMD-4 (2001).

E Ink Corporation, "Improvements in Eletro-Optic Displays", ip.com No. IPCOM000244343D, Dec. 3, 2015.

E Ink Corporation, "Applications of Electro-Optic Displays", ip.com No. IPCOM000238455D, Aug. 27, 2014.

Korean Intellectual Property Office, PCT/US2018/066419, International Search Report and Written Opinion, dated Apr. 12, 2019.

* cited by examiner

APPLICATIONS OF ELECTRO-OPTIC DISPLAYS

REFERENCE TO RELATED APPLICATIONS

This application claims benefit of Application Ser. No. 62/607,377, filed Dec. 19, 2017.

This application is also related to U.S. Published Applications Serial Nos. 2016/0259225 (now U.S. Pat. No. 10,175,550, issued Jan. 8, 2019) and 2016/0232835 (now U.S. Pat. No. 10,573,222, issued Feb. 25, 2020); U.S. Pat. Nos. 6,445,489; 6,704,133; 6,753,999 and 6,825,829; and provisional Application Ser. No. 62/703,156, filed Jul. 25, 2018 (now published as U.S. Patent Application No. 2020/0032081). The entire contents these patents and applications and of all U.S. patents and published and applications mentioned below, are herein incorporated by reference.

BACKGROUND OF INVENTION

This invention relates to applications of electro-optic displays. More specifically, this invention relates to uses of electro-optic displays, especially but not exclusively, particle-based electrophoretic displays, in architectural, furnishing and similar applications.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example the aforementioned white and dark blue states. The term "monochrome" may be used hereinafter to denote a drive scheme which only drives pixels to their two extreme optical states with no intervening gray states.

Some electro-optic materials are solid in the sense that the materials have solid external surfaces, although the materials may, and often do, have internal liquid- or gas-filled spaces. Such displays using solid electro-optic materials may hereinafter for convenience be referred to as "solid electro-optic displays". Thus, the term "solid electro-optic displays" includes rotating bichromal member displays, encapsulated electrophoretic displays, microcell electrophoretic displays and encapsulated liquid crystal displays.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y, et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT), E Ink Corporation, E Ink California, LLC. and related companies describe various technologies used in encapsulated and microcell electrophoretic and other electro-optic media. Encapsulated electrophoretic media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. In a microcell electrophoretic display, the charged particles and the fluid are not encapsulated within microcapsules but instead are retained within a plurality of cavities formed within a carrier medium, typically a polymeric film. The technologies described in these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Microcell structures, wall materials, and methods of forming microcells; see for example U.S. Pat. Nos. 7,072,095 and 9,279,906;

(d) Methods for filling and sealing microcells; see for example U.S. Pat. Nos. 7,144,942 and 7,715,088;

(e) Films and sub-assemblies containing electro-optic materials; see for example U.S. Pat. Nos. 6,825,829; 6,982,178; 7,112,114; 7,158,282; 7,236,292; 7,443,571; 7,513,813; 7,561,324; 7,636,191; 7,649,666; 7,728,811; 7,729,039; 7,791,782; 7,839,564; 7,843,621; 7,843,624; 8,034,209; 8,068,272; 8,077,381; 8,177,942; 8,390,301; 8,482,835; 8,786,929; 8,830,553; 8,854,721; 9,075,280; and 9,238,340; and U.S. Patent Applications Publication Nos. 2007/0237962; 2009/0109519; 2009/0168067; 2011/0164301; 2014/0115884; and 2014/0340738;

(f) Backplanes, adhesive layers and other auxiliary layers and methods used in displays; see for example U.S. Pat. Nos. 7,116,318 and 7,535,624;

(g) Color formation and color adjustment; see for example U.S. Pat. Nos. 6,017,584; 6,545,797; 6,664,944; 6,788,452; 6,864,875; 6,914,714; 6,972,893; 7,038,656; 7,038,670; 7,046,228; 7,052,571; 7,075,502; 7,167,155; 7,385,751; 7,492,505; 7,667,684; 7,684,108; 7,791,789; 7,800,813; 7,821,702; 7,839,564; 7,910,175; 7,952,790; 7,956,841; 7,982,941; 8,040,594; 8,054,526; 8,098,418; 8,159,636; 8,213,076; 8,363,299; 8,422,116; 8,441,714; 8,441,716; 8,466,852; 8,503,063; 8,576,470; 8,576,475; 8,593,721; 8,605,354; 8,649,084; 8,670,174; 8,704,756; 8,717,664; 8,786,935; 8,797,634; 8,810,899; 8,830,559; 8,873,129; 8,902,153; 8,902,491; 8,917,439; 8,964,282; 9,013,783; 9,116,412; 9,146,439; 9,164,207; 9,170,467; 9,170,468; 9,182,646; 9,195,111; 9,199,441; 9,268,191; 9,285,649; 9,293,511; 9,341,916; 9,360,733; 9,361,836; 9,383,623; and 9,423,666; and U.S. Patent Applications Publication Nos. 2008/0043318; 2008/0048970; 2009/0225398; 2010/0156780; 2011/0043543; 2012/0326957; 2013/0242378; 2013/0278995; 2014/0055840; 2014/0078576; 2014/0340430; 2014/0340736; 2014/0362213; 2015/0103394; 2015/0118390; 2015/0124345; 2015/0198858; 2015/0234250; 2015/0268531; 2015/0301246; 2016/0011484; 2016/0026062; 2016/0048054; 2016/0116816; 2016/0116818; and 2016/0140909;

(h) Methods for driving displays; see for example U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,061,166; 7,061,662; 7,116,466; 7,119,772; 7,177,066; 7,193,625; 7,202,847; 7,242,514; 7,259,744; 7,304,787; 7,312,794; 7,327,511; 7,408,699; 7,453,445; 7,492,339; 7,528,822; 7,545,358; 7,583,251; 7,602,374; 7,612,760; 7,679,599; 7,679,813; 7,683,606; 7,688,297; 7,729,039; 7,733,311; 7,733,335; 7,787,169; 7,859,742; 7,952,557; 7,956,841; 7,982,479; 7,999,787; 8,077,141; 8,125,501; 8,139,050; 8,174,490; 8,243,013; 8,274,472; 8,289,250; 8,300,006; 8,305,341; 8,314,784; 8,373,649; 8,384,658; 8,456,414; 8,462,102; 8,514,168; 8,537,105; 8,558,783; 8,558,785; 8,558,786; 8,558,855; 8,576,164; 8,576,259; 8,593,396; 8,605,032; 8,643,595; 8,665,206; 8,681,191; 8,730,153; 8,810,525; 8,928,562; 8,928,641; 8,976,444; 9,013,394; 9,019,197; 9,019,198; 9,019,318; 9,082,352; 9,171,508; 9,218,773; 9,224,338; 9,224,342; 9,224,344; 9,230,492; 9,251,736; 9,262,973; 9,269,311; 9,299,294; 9,373,289; 9,390,066; 9,390,661; and 9,412,314; and U.S. Patent Applications Publication Nos. 2003/0102858; 2004/0246562; 2005/0253777; 2007/0091418; 2007/0103427; 2007/0176912; 2008/0024429; 2008/0024482; 2008/0136774; 2008/0291129; 2008/0303780; 2009/0174651; 2009/0195568; 2009/0322721; 2010/0194733; 2010/0194789; 2010/0220121; 2010/0265561; 2010/0283804; 2011/0063314; 2011/0175875; 2011/0193840; 2011/0193841; 2011/0199671; 2011/0221740; 2012/0001957; 2012/0098740; 2013/0063333; 2013/0194250; 2013/0249782; 2013/0321278; 2014/0009817; 2014/0085355; 2014/0204012; 2014/0218277; 2014/0240210; 2014/0240373; 2014/0253425; 2014/0292830; 2014/0293398; 2014/0333685; 2014/0340734; 2015/0070744; 2015/0097877; 2015/0109283; 2015/0213749; 2015/0213765; 2015/0221257; 2015/0262255; 2015/0262551; 2016/0071465; 2016/0078820; 2016/0093253; 2016/0140910; and 2016/0180777;

(i) Applications of displays; see for example U.S. Pat. Nos. 6,118,426; 6,473,072; 6,704,133; 6,710,540; 6,738,050; 6,825,829; 7,030,854; 7,119,759; 7,312,784; 7,705,824; 8,009,348; 8,011,592; 8,064,962; 8,162,212; 8,553,012; 8,973,837; 9,188,829; and 9,197,704; and U.S. Patent Applications Publication Nos. 2002/0090980; 2004/0119681; 2007/0285385; 2013/0176288; 2013/0221112; 2013/0233930; 2013/

0235536; 2014/0049808; 2014/0062391; 2014/0206292; and 2016/0035291; and International Application Publication No. WO 00/36560 (and see also IP.com Prior Art Database Technical Disclosures Nos. 000244343 and 000238455, published by ip.com, of 370 Woodcliff Drive, Suite 301, Fairport N.Y. 14450); and (j) Non-electrophoretic displays, as described in U.S. Pat. Nos. 6,241,921; 6,784,953 and U.S. Patent Application Publication No. 2015/0277160; and applications of encapsulation and microcell technology other than displays; see for example U.S. Pat. No. 7,615,325; and U.S. Patent Application Publications Nos. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

Other types of electro-optic materials may also be used in the present invention.

An electro-optic display normally comprises a layer of electro-optic material and at least two other layers disposed on opposed sides of the electro-optic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electro-optic display, which is intended for use with a stylus, print head or similar movable electrode separate from the display, only one of the layers adjacent the electro-optic layer comprises an electrode, the layer on the opposed side of the electro-optic layer typically being a protective layer intended to prevent the movable electrode damaging the electro-optic layer.

The manufacture of a three-layer electro-optic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium-tin-oxide (ITO) or a similar conductive coating (which acts as one electrode of the final display) on a plastic film, the capsules/binder coating being dried to form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. (A very similar process can be used to prepare an electrophoretic display usable with a stylus or similar movable electrode by replacing the backplane with a simple protective layer, such as a plastic film, over which the stylus or other movable electrode can slide.) In one preferred form of such a process, the backplane is itself flexible and is prepared by printing the pixel electrodes and conductors on a plastic film or other flexible substrate. The obvious lamination technique for mass production of displays by this process is roll lamination using a lamination adhesive. Similar manufacturing techniques can be used with other types of electro-optic displays. For example, a microcell electrophoretic medium or a rotating bichromal member medium may be laminated to a backplane in substantially the same manner as an encapsulated electrophoretic medium.

As discussed in the aforementioned U.S. Pat. No. 6,982,178, (see column 3, lines 63 to column 5, line 46) many of the components used in solid electro-optic displays, and the methods used to manufacture such displays, are derived from technology used in liquid crystal displays (LCD's), which are of course also electro-optic displays, though using a liquid rather than a solid medium. For example, solid electro-optic displays may make use of an active matrix backplane comprising an array of transistors or diodes and a corresponding array of pixel electrodes, and a "continuous" front electrode (in the sense of an electrode which extends over multiple pixels and typically the whole display)

on a transparent substrate, these components being essentially the same as in LCD's. However, the methods used for assembling LCD's cannot be used with solid electro-optic displays. LCD's are normally assembled by forming the backplane and front electrode on separate glass substrates, then adhesively securing these components together leaving a small aperture between them, placing the resultant assembly under vacuum, and immersing the assembly in a bath of the liquid crystal, so that the liquid crystal flows through the aperture between the backplane and the front electrode. Finally, with the liquid crystal in place, the aperture is sealed to provide the final display.

This LCD assembly process cannot readily be transferred to solid electro-optic displays. Because the electro-optic material is solid, it must be present between the backplane and the front electrode before these two integers are secured to each other. Furthermore, in contrast to a liquid crystal material, which is simply placed between the front electrode and the backplane without being attached to either, a solid electro-optic medium normally needs to be secured to both; in most cases the solid electro-optic medium is formed on the front electrode, since this is generally easier than forming the medium on the circuitry-containing backplane, and the front electrode/electro-optic medium combination is then laminated to the backplane, typically by covering the entire surface of the electro-optic medium with an adhesive and laminating under heat, pressure and possibly vacuum. Accordingly, most prior art methods for final lamination of solid electrophoretic displays are essentially batch methods in which (typically) the electro-optic medium, a lamination adhesive and a backplane are brought together immediately prior to final assembly, and it is desirable to provide methods better adapted for mass production.

Electro-optic displays are often costly; for example, the cost of the color LCD found in a portable computer is typically a substantial fraction of the entire cost of the computer. As the use of electro-optic displays spreads to devices, such as cellular telephones and personal digital assistants (PDA's), much less costly than portable computers, there is great pressure to reduce the costs of such displays. The ability to form layers of some solid electro-optic media by printing techniques on flexible substrates, as discussed above, opens up the possibility of reducing the cost of electro-optic components of displays by using mass production techniques such as roll-to-roll coating using commercial equipment used for the production of coated papers, polymeric films and similar media.

The aforementioned U.S. Pat. No. 6,982,178 describes a method of assembling a solid electro-optic display (including an encapsulated electrophoretic display) which is well adapted for mass production. Essentially, this patent describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet. (The term "light-transmissive" is used in this patent and herein to mean that the layer thus designated transmits sufficient light to enable an observer, looking through that layer, to observe the change in display states of the electro-optic medium, which will normally be viewed through the electrically-conductive layer and adjacent substrate (if present); in cases where the electro-optic medium displays a change in reflectivity at non-visible wavelengths, the term "light-transmissive" should of course be interpreted to refer to transmission of the relevant non-visible wavelengths.) Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this patent and herein to mean that the layer thus designated transmits sufficient light to enable an observer, looking through that layer, to observe the change in display states of the electro-optic medium, which will normally be viewed through the electrically-conductive layer and adjacent substrate (if present); in cases where the electro-optic medium displays a change in reflectivity at non-visible wavelengths, the term "light-transmissive" should of course be interpreted to refer to transmission of the relevant non-visible wavelengths. The substrate will typically be a polymeric film, and will normally have a thickness in the range of about 1 to about 25 mil (25 to 634 µm), preferably about 2 to about 10 mil (51 to 254 µm). The electrically-conductive layer is conveniently a thin metal or metal oxide layer of, for example, aluminum or ITO, or may be a conductive polymer. Poly(ethylene terephthalate) (PET) films coated with aluminum or ITO are available commercially, for example as "aluminized Mylar" ("Mylar" is a Registered Trade Mark) from E.I. du Pont de Nemours & Company, Wilmington Del., and such commercial materials may be used with good results in the front plane laminate.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electro-optic medium and electrically-conductive layer to the backplane. This process is well-adapted to mass production since the front plane laminate may be mass produced, typically using roll-to-roll coating techniques, and then cut into pieces of any size needed for use with specific backplanes.

U.S. Pat. No. 7,561,324 describes a so-called "double release sheet" which is essentially a simplified version of the front plane laminate of the aforementioned U.S. Pat. No. 6,982,178. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display, although the order of these two laminations could be reversed if desired.

U.S. Pat. No. 7,839,564 describes a so-called "inverted front plane laminate", which is a variant of the front plane laminate described in the aforementioned U.S. Pat. No. 6,982,178. This inverted front plane laminate comprises, in order, at least one of a light-transmissive protective layer and a light-transmissive electrically-conductive layer; an adhesive layer; a layer of a solid electro-optic medium; and a release sheet. This inverted front plane laminate is used to form an electro-optic display having a layer of lamination adhesive between the electro-optic layer and the front electrode or front substrate; a second, typically thin layer of adhesive may or may not be present between the electro-optic layer and a backplane. Such electro-optic displays can combine good resolution with good low temperature performance.

Electrophoretic and similar bistable electro-optic display media have until now been primarily used in electronic document readers (E-book readers), with some use in electronic storage media such as flash drives, portable computers, tablet computers, cellular telephones, smart cards, signs, watches, shelf labels, and variable transmission windows. However, the low power requirements, flexibility and light weight of electrophoretic and similar bistable electro-optic display media render them useful in numerous other applications, especially architectural and related applications.

The aforementioned US 2016/0259225 describes several application of electrophoretic displays in architectural application, especially color-changing tiles and other means of changing the color of room décor to alter the mood of a room. The aforementioned US 2016/0232835 describes driving method for electrophoretic displays which are particularly useful for large area displays, such as in furniture and architectural applications.

The term "architectural surface" is used herein to denote a surface of a building or similar structure, for example, a portable building, travel trailer or recreational vehicle, whether internal or external, although the inventions described below are likely to be used mainly on internal surfaces. The term "architectural surface" is also intended to include surfaces of architectural fixtures, and movable or permanent structures, such a room dividers, which act as temporary or permanent walls within buildings. Thus, the term "architectural surface" includes not only walls, ceilings and floors of buildings and similar structures, but surfaces of, for example, kitchen cabinets, appliances and islands, and the surfaces of doors, screens and room dividers.

As discussed in detail in the aforementioned US 2016/0259225, electro-optic displays, especially bistable electro-optic displays, open up novel possibilities for the treatment of architectural surfaces which allow for variation of the appearance of the surface, including patterning or displaying images on architectural surfaces; in effect, entire walls (or other similar surfaces, such as ceilings and room partitions or dividers) can become displays. Such "wall displays" may be useful in rooms used for multiple functions (such as hotel and similar function rooms) only a small proportion of which require large visual displays. In such cases, the cost of a large monitor may be difficult to justify and the appearance of the monitor when not is use (for the majority of the time the function room is used) may be objectionable. Similarly, the cost of a large, retractable projection screen and associated driving apparatus may be difficult to justify. Ideally, in such situations one would like have a large area of wall or similar surface which can be used to display images when required but which simply appears as a conventional wall surface when not in use for displaying images. The present invention seeks to provide such a wall display.

Although present technology is capable of providing very large areas of electrophoretic and other display media, if necessary by joining parallel strips of such media, the major difficulty in providing large, high resolution displays is finding a way to drive the display. To a large extent, the complexity and cost of current display solutions have limited this type of application. To create a high resolution image on a large display area currently requires either an active matrix backplane or a passive matrix display, either of which requires complex electrical connections and a large number of drive signals; especially on an architectural scale, which could involve displays of 100 square feet (about 10 square meters) or more, the cost of any current active matrix or passive matrix display would be prohibitive for most applications. The present invention seeks to provide method of driving an architectural scale display in an economical manner.

Another aspect of the present invention relates to color adjustment on walls and similar architectural surfaces. It is notoriously difficult for most "laymen" (in this context, meaning those who are not skilled in color science) to select paints and other coloring materials (for example, floor, wall or ceiling tiles) to produce a desired effect in a room. Traditionally, retail stores provide small samples ("swatches") of colors available in the paints they sell. Even if the swatches accurately represent the paint colors (and the differences between pigment-based paints and dye-based printing make exact matching difficult), viewing a small swatch in a large retail store under artificial illumination usually different from that used in homes, and surrounded by a palette of colors (for example, gray concrete floors, red or yellow metal racks and gray ceilings) bearing no resemblance to that typically present in a home, is likely to leave most layman choosing a paint color differing markedly from that they really want. Even if the customer takes a limited number of swatches home to evaluate them in situ, at least two major problems remain. Some colors may be perceived very differently depending upon whether they are illuminated with natural or artificial light, and the color perceived in natural light may vary considerable depending upon whether the natural light is the white light of noon or the more roseate light near dawn or dusk, and customers frequently fail to test the swatches under varying lighting conditions. Furthermore, because of the structure of the human eye, in which the color-perceiving cones are concentrated in the central area, with a preponderance of color-insensitive rods on the periphery, human color perception varies with the size of the color sample being viewed; there is a significant difference between so-called 2° color (in which the color sample subtends 2 degrees of arc as seen by the eye) and 10° color. In particular, pale (relatively unsaturated colors) tend to appear more saturated when large expanses of color are being viewed.

In an effort to reduce these problems, many paint stores now sell small samples of paint, enough to paint about one or two square feet of wall, so that customers can test various colors before making their final choice. However, buying and applying several paint samples involves significant expense and labor, and the appearance of a sample patch, which will typically be viewed against a background of the existing wall color, may still not accurately reflect the appearance of an entire wall of the same color; for example, a pale blue patch viewed against an existing yellow background may appear somewhat more saturated than the final pale blue wall, while a purple patch viewed against a red background will appear shifted towards blue. Furthermore, leaving several different patches of color on a wall may cause problems after later repainting, since the various colors may tend to show through the final color, leaving either a non-uniform final color or requiring an extra coat of paint to overcome the show through colors.

The result of all the aforementioned problems is that when it comes to selecting colors for indoor architectural features, most people find selecting the correct color to be a daunting task. Often, people have a particular hue or tone in mind but are disappointed by the appearance of their painting (or other color application, such as floor tiling), and their disappointment is increased by the fact repainting is the only corrective action available.

Furthermore, for reasons discussed in more detail in the aforementioned US 2016/0259225, it may be desirable to vary the color of architectural surfaces to allow for changes in the use of a room (for example, warm colors tend to more appropriate for friendly social gatherings, whereas cool colors may be more appropriate for study) or changes in lighting conditions, time of day or season of year, etc.

The present invention seeks to provide a treatment for architectural surfaces which reduces or overcomes the problems discussed above, and allows adjustment of the appearance of the surface without repainting.

SUMMARY OF INVENTION

In another aspect, this invention provides a method of forming an image on an architectural surface, the method comprising:
applying to the architectural surface, in order:
a rear electrode layer;
a light-transmissive front electrode layer;
a photoconductive layer disposed between the front and rear electrode layers; and
an electro-optic layer disposed between the front and rear electrode layers;
applying a potential difference between the front and rear electrode layers; and imagewise exposing the front electrode layer to radiation effective to cause a change in the conductivity of the photoconductive layer, thereby causing an imagewise change in the optical state of the electro-optic layer.

In this image-forming method, the photoconductive layer and the electro-optic layer may be arranged in either order between the two electrode layers. Typically, the photoconductive layer will be arranged between the electro-optic layer and the rear electrode because many photoconductive layers are either opaque or strongly colored, and hence would distort the color of the electro-optic layer as viewed by an observer seeing this layer through the front electrode. However, if the photoconductive layer used is substantially transparent, or colored in a manner which is not objectionable to the observer (for example, a yellow photoconductive layer in front of a black-white electro-optic layer might be used to provide a black-yellow display), the photoconductive layer may be disposed between the electro-optic layer and the front electrode (i.e., in front of the electro-optic layer). If the electro-optic layer strongly absorbs the radiation used for the imagewise exposure, it may be necessary to dispose the photoconductive layer in front of the electro-optic layer. Note that although the image produced will normally need to be visible to the human eye, there is no requirement that the radiation used for the imagewise exposure be visible; indeed, in some cases it may be convenient to use non-visible radiation (for example, near ultra-violet radiation) so as to allow for the formation of am image without any visible projection beam.

In one form of this method, the imagewise exposure is effected by projecting an image on to the architectural surface using a projector. Alternatively, particularly where the space in front of the architectural surface is limited, the imagewise exposure could be effected by passing a row of light emitters (for example, a strip of light emitting diodes) over the architectural surface; although this method is likely to be much slower than projecting the whole image at once, it may be acceptable in many architectural applications, where images may only be changed at lengthy intervals. If desired, the row of light emitters could be static along one edge of the display and a moving angled mirror could be used to direct light from the light emitters on to the display itself.

In the image forming method of the present invention, the stack provided on the architectural surface may include additional layers. In particular, the stack may include an additional adhesive layer between the front electrode layer and the electro-optic layer and/or between the electro-optic layer and the rear electrode layer. The film may also include a protective layer on the opposed side of the front electrode layer from the electro-optic layer. The film may also include any of the optional features of front plane laminates, inverted front plane laminates or double release films in the patents and applications discussed above.

In one aspect, this invention provides a film for application to an architectural surface, the film comprising, in order:
a light-transmissive colored front electrode layer;
an electro-optic layer;
a rear electrode layer; and
an adhesive layer,
the film being provided with at least one front connecting means for connecting the front electrode layer to a first conductor placed on the architectural surface and/or the front electrode layer of an adjacent film, and also being provided with at least one rear connecting means for connecting the rear electrode layer to a second conductor placed on the architectural surface and/or the rear electrode layer of an adjacent film.

The light-transmissive colored front electrode layer may be a single layer of, for example, a dyed conductive polymer, such as a polythiophene. However, some common types of light-transmissive electrodes, for example sputtered metal oxides such as indium tin oxide, are not readily available in colored form, and in such cases it will generally be convenient to provide the light-transmissive colored front electrode layer as a double layer, with the conductive layer closer to the electro-optic layer and a separate colored layer on the opposed side of the conductive layer from the electro-optic layer.

There are two main variants of the film of the present invention. In the first variant, the electro-optic layer is a black-and-white film (i.e., one having black and white extreme states, and typically a number of gray states intermediate the black and white extreme states). This film variant allows one to alter the color tone of the architectural surface by modulating the reflectivity of the electro-optic layer behind the light-transmissive colored layer. In the second variant, the electro-optic layer is capable of displaying at least two different colors, so that one can alter the hue, and preferably also the tone, of the architectural surface by modulating the color (and preferably reflectivity) of the electro-optic layer.

The films of the present invention may have a variety of physical forms. When used on walls or similar vertical surfaces they may be in the form of long rolls which can be applied to the vertical surfaces in the same manner as conventional wallpaper. (In this case, provided that appropriate moisture barriers are provided to protect the electrode layers and the electro-optic layer, the adhesive layer may be of the water-activated type so that the film can be applied in the same manner as pre-pasted wallpaper.) Films intended to application to horizontal surfaces, such as countertops and ceilings, may also be in the form of rolls. Films intended for application to floors may be in the form of tiles, in which case it may be convenient to form the front and rear connecting means as edge connectors on each tile to make contact with adjacent tiles to allow multiple tiles to switch simultaneously.

The adhesive layer will typically be a pressure-sensitive adhesive, in which case the adhesive layer will normally need to be covered with a release sheet to prevent unwanted adhesion of the adhesive to other materials during transit, including other portions of the film if a long film is rolled during storage or transit. However, other types of adhesive may be used. For example, in some types of tiles intended for application to a relatively rough sub-floor, it may be desirable to a flowable heat-activated adhesive and expose the tiles to an appropriate temperature immediately prior to contacting them with the sub-floor. Also, as previously noted, water-activated adhesives may be used.

The front and rear connecting means (hereinafter "front and rear connectors") may also have a variety of physical forms. In the case of films applied in the same manner as wallpaper, it will generally be convenient to supply operating voltages to the front and rear electrodes via two horizontal conductors running adjacent the upper and lower edges of the portion of the wall to which the film is to be applied. The front and rear connectors can then have the form of extensions of the front and rear electrode layers extending laterally beyond one or both lateral edges of the film and making electrical contact with horizontal conductors either directly or via conductive adhesives. Such front and rear connectors may be hidden behind adjacent pieces of film, and to prevent electrical short circuits it may be desirable to cover the exposed surfaces of the extensions with an insulating layer. Instead of providing an extension of the rear electrode layer, direct electrical contact may be effected between the rear electrode layer and an underlying conductor by, for example, doping a portion of the adhesive layer to render it sufficiently conductor (see U.S. Pat. No. 7,012,735 for dopants for increasing the conductivity of adhesives, removing a portion of the adhesive layer, and optionally replacing it with a conductive adhesive, or using a conductor with a rough surface and pressing the film on to the conductor until projections on the rough surface make contact with the rear electrode layer.

The film of the present invention may include additional layers. In particular, the film may include an additional adhesive layer between the front electrode layer and the electro-optic layer and/or between the electro-optic layer and the rear electrode layer. The film may also include a protective layer on the opposed side of the light-transmissive colored layer from the electro-optic layer (or the light-transmissive colored layer may also be configured to act as a protective layer to protect the remaining layers of the display from mechanical damage). The film may also include any of the optional features of front plane laminates, inverted front plane laminates or double release films in the patents and applications discussed above.

In another aspect, this invention provides a method of coating an architectural surface, the method comprising:
providing a film of the present invention having a release sheet;
removing the release sheet from the film; and
applying the film, less the release sheet, to an architectural surface.

In another aspect this invention provides an architectural surface provided with spaced first and second conductors, and a plurality of pieces of a film of the present invention adhered to the architectural surface, with the front connecting means of each of the plurality of pieces electrically connected to the first conductor and the rear connecting means of each of the plurality of pieces electrically connected to the second conductor.

Some electro-optic layers used in the films of the present invention (and in the structures used in the image-forming method of the present invention), especially electrophoretic films, typically contain inflammable organic fluids, and may also contain polymeric films capable of ignition. Accordingly, at least some jurisdictions may require the exposed surfaces of the films or structures to be provided with an intumescent (fire-resistant) coating. Many conventional intumescent coatings are essentially opaque and thus unsuitable for use with films of the present invention. If a film of the present invention or an image-receiving surface used in the method of the present invention requires an intumescent coating, such a coating is preferably of the type described in the aforementioned provisional Application Ser. No. 62/703,156, the entire disclosure of which is incorporated herein by reference. These intumescent coatings comprise a layer of an intumescent material and at least one moisture barrier in contact with at least one surface of the layer of intumescent material, the intumescent material comprising an amine or amide containing compound. The intumescent material may be provided with first and second moisture barriers, with the intumescent material disposed between the first and second moisture barriers. The or each moisture barrier may comprise a protective film and a layer of adhesive. The protective film may comprise a material selected from the group consisting of polyethylene terephthalate, polyethylene naphthalate, polycarbonate, polyimides, cyclic olefin homopolymers or copolymers, and combinations thereof. The layer of adhesive may comprise an optically clear adhesive material. The moisture barrier may have has a water vapor transmission rate (WVTR) less than or equal to 0.01 $g/m^2$/day at 60° C. and 100% relative humidity. The intumescent material may include a char-forming carbonaceous material, a dehydration catalyst, and a blowing agent. The char-forming carbonaceous material may be selected from the group consisting of polyols, polyamide-6, nanocomposites of polyamide-6 and clay, triazine derivatives, isocyanurate derivatives, ethanolamine-aminotriazine oligomers, and combinations thereof. The dehydration catalyst may be selected from the group consisting of ammonium polyphosphate, ammonium pyrophosphate, melamine phosphate, melamine pyrophosphate, melamine polyphosphate, chloroalkyl phosphates, chloroalkyl phosphonates, esters of organic phosphates or phosphonates, and combinations thereof. The blowing agent may be selected from the group consisting of melamine, triazine derivatives, and combinations thereof. The intumescent material may also comprise a binder resin, which may be selected from the group consisting of melamine formaldehyde, urea formaldehyde, polyacrylates, polyurethanes, polyvinyls, EVAs, PVAc, epoxides, silicates, and combinations thereof. The intumescent material may also comprise a plasticizer, which may be selected from the group consisting of glycerol and ethylene glycol. At least a portion of the layer of intumescent material will normally be located between the at least one moisture barrier and the layer of electro-optic material.

DETAILED DESCRIPTION

Specific embodiments of the present invention will now be described in more detail, though by way of illustration only, with reference to the accompanying drawings.

Part A: Image-forming method of the present invention

As already mentioned, in one aspect the present invention provides a method of forming an image on an architectural surface, the method comprising applying to the architectural surface, in order: a rear electrode layer; a light-transmissive front electrode layer; a photoconductive layer disposed between the front and rear electrode layers; and an electro-optic layer disposed between the front and rear electrode layers; applying a potential difference between the front and rear electrode layers; and imagewise exposing the front electrode layer to radiation effective to cause a change in the conductivity of the photoconductive layer, thereby causing an imagewise change in the optical state of the electro-optic layer.

The image-forming method of the present invention is designed to allow architectural sized (100 square foot, 10 square meter, or larger) high resolution images to be produced using unpatterned display media (i.e., with only two simple continuous electrodes, rather than a matrix of electrodes defining the pixels of the display) and no embedded electronic drivers. Essentially, the present invention solves this problem by inserting a layer of photoconductive material between the electrodes of an electro-optic display, thus forming a dual stimulus device, the stimuli being electric field and radiation, such that the display medium is addressed only when both stimuli are present.

Figure 1:
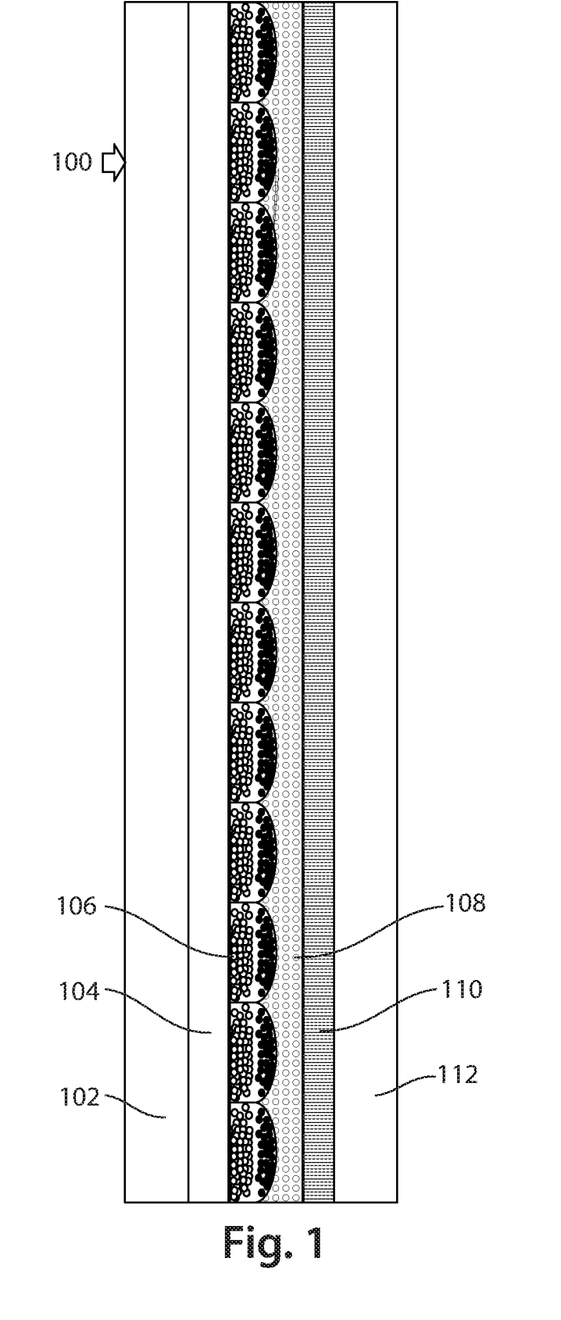
FIG. 1 is a schematic cross-section through a film used in the image-forming method of the present invention.

FIG. 1 is a schematic cross-section through a film (generally designated 100) useful in the image-forming method of the present invention. The film 100 comprises a protective layer 102 (which may be omitted depending upon the materials used for the remaining layers of the film), a light-transmissive continuous front electrode layer 104, an electro-optic layer 106 (illustrated as a dual particle encapsulated electrophoretic layer), a lamination adhesive layer 108, a photoconductive layer 110 and a continuous rear electrode layer 112. Note that the photoconductive layer 110 is disposed between the electrode layer 104 and the rear electrode layer 112, and that the reference to "continuous" electrode layers does not preclude multiple electrodes being used in large displays; indeed, given that some light-transmissive electrode layers, for example sputtered metal oxides, have relatively high resistance, it may be desirable to break the electrode layers of very large displays into multiple segments not larger than (say) 600 mm square to avoid slow switching due to electrode resistance.

Figure 2:
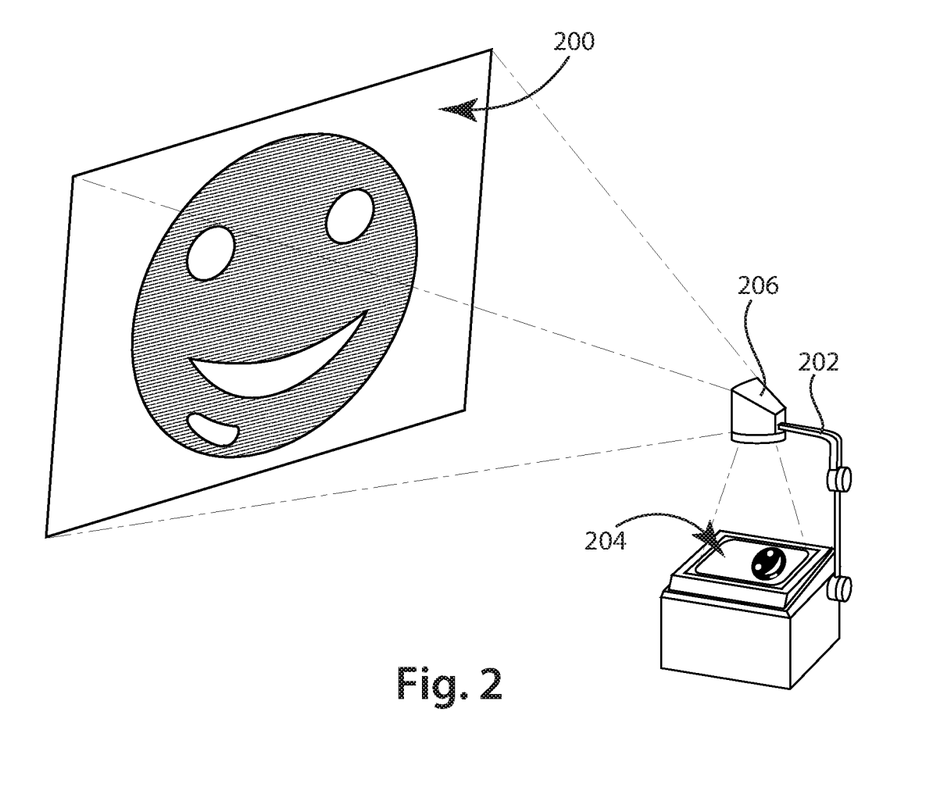
FIG. 2 is a perspective view showing the image-forming method of the present invention being carried out using a projector.

FIG. 2 illustrates the image-forming method of the present invention being effected using the display of FIG. 1, in the form of large screen 200 (or even an entire wall of a room, if desired). A projector 202, which is conveniently of the type which passes light up through a transparency 204 and then deflects the light horizontally by means of an angled mirror assembly 206, is used to project an image of the transparency 204 on to the screen 200. There is applied between the electrode layers 104 and 112 (FIG. 1) a potential difference having a magnitude and polarity sufficient to drive the screen 200 from black to white provided the photoconductive layer 110 is in its conductive state. The screen 200 is initially set to solid black. In areas where no light reaches the screen 200, the resistance of the photoconductive layer 110 remains high, and the screen remains black. However, in areas where light reaches the screen 200, the photoconductive layer 110 becomes conductive and essentially the whole potential difference between the electrode layers is applied across the electro-optic layer 106, thereby causing these areas to change from black to white (or from black to varying shades of gray, depending upon the specific electro-optic medium used), and reproducing on the screen the image on the transparency 204.

When it is desired to produce a different image on the screen 200, the screen may be erased by removing the transparency 204 from the projector 202, thus allowing the entire area of the screen to be illuminated (and the entire photoconductive layer 110 thus rendered conductive), and applying between the electrode layers 104 and 112 a potential difference having a magnitude and polarity sufficient to drive the entire screen black. In practice, to avoid certain "memory" or "ghosting" effects common in certain electro-optic displays, it may be advisable to drive the entire screen from black to white and back again several times by reversing the polarity of the potential difference between the electrode layers 104 and 112.

It will be appreciated that the resolution of the image provided on the screen 200 is limited only by the resolution of the image provided by the projector 202, and any of the commercially known methods for the creation of high resolution projected images (for example, LCD projectors driven by computers) can be used. It is not essential to start image formation from a black screen; one could start from a white screen and drive the exposed areas to black (or to black and intermediate shades of gray), but note that in this case the final image would be a negative of the transparency 204.

The film shown in FIG. 1 can readily be produced by a modification of the front plane laminate production process described in the aforementioned U.S. Pat. No. 6,982,178. The electro-optic medium can be coated on the front electrode layer in the usual manner. Separately, the photoconductive layer is formed on the rear electrode layer, and the lamination adhesive layer coated over the photoconductive layer. The rear electrode/photoconductive layer/adhesive layer sub-assembly can then be laminated to the sub-assembly containing the electro-optic layer in the usual way.

The film used in the image-forming method of the present invention may be provided with a second adhesive layer and a release sheet on the opposed side of the rear electrode layer from the electro-optic layer to facilitate attachment of the film to an architectural surface, in the same manner as already described for the films of the present invention.

From the foregoing it will be seen that the image-forming method of the present invention allows high resolution addressing of large architectural displays using simple media with unpatterned electrodes. Also, using projected light to form the image makes the driving method simple and inexpensive.

Part B: Films for varying appearance of architectural surfaces

As already mentioned, in one aspect this invention provides a film for application to an architectural surface, the film comprising, in order: a light-transmissive colored layer; a light-transmissive front electrode layer; an electro-optic layer; a rear electrode layer; an adhesive layer; and a release sheet. This film is intended to be applied to an architectural surface by peeling the release sheet from the remaining layer of the film and contacting the adhesive layer (after any necessary activation, such as heating, if required) with the architectural surface, thereby securing the film (less the release sheet) to the architectural surface.

Figure 3:
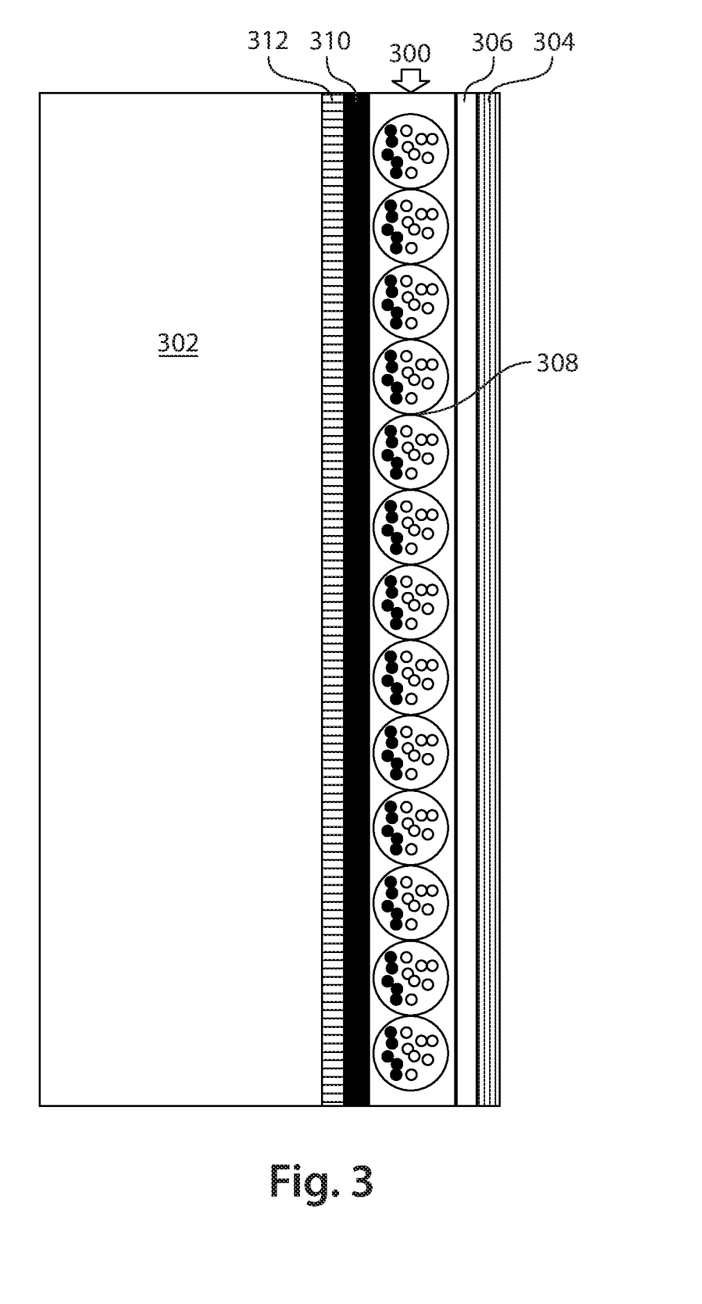
FIG. 3 is a schematic cross-section through a film of the present invention applied to a wall.

FIG. 3 is a schematic cross-section through a variable tone film (generally designated 300) of the present invention applied to a wall 302. The film 300 comprises a light-transmissive colored layer 304, having the form of a receiver film with a painted, light-transmissive colored overlay. The colored layer 304 is fixed to a light-transmissive front electrode layer 306, which is in contact with an electro-optic layer 308, illustrated as an encapsulated electrophoretic medium comprising black and white particles dispersed in a colorless fluid. On the opposed side of the electro-optic layer 308 from the front electrode layer 306 are a rear electrode layer 310 and a lamination adhesive layer 312, which is in direct contact with the wall 302. Prior to being applied to the wall 302, the film 300 also comprised a release sheet (not shown) covering the lamination adhesive layer 312; this release sheet was of course removed to enable the lamination adhesive layer 312 to adhere to the wall 302.

As will be apparent from the foregoing description, the film 300 may be produced by first producing a front plane laminate (FPL) as described in the aforementioned U.S. Pat. No. 6,982,178, starting from a film comprising the colored layer 304 and the front electrode layer 306. Separately, the lamination adhesive layer 312 is coated on to the release sheet, and the resultant adhesive layer/release sheet sub-assembly laminated to the rear electrode layer of the FPL to produce the final film. Such a process will leave an "extra" adhesive layer between the electro-optic layer 308 and the rear electrode layer 310 but such an extra adhesive layer is not objectionable provided it has the appropriate conductivity. Obviously, various other processes may be used to form the film 300. In particular, since the rear electrode layer 310 is planar, the electro-optic layer 308 could be coated on to the rear electrode 310, and thereafter a sub-assembly comprising the colored layer 304, front electrode layer 306 and a lamination adhesive layer could be laminated to the exposed electro-optic layer 308. Such a process will leave an "extra" adhesive layer between the electro-optic layer 308 and the front electrode layer 306 but such an extra adhesive layer is not objectionable provided it has the appropriate conductivity. This process has the advantage of avoiding subjecting the colored layer 304 to the elevated temperatures typically required to dry the electro-optic layer 308 when that layer is an encapsulated electrophoretic medium.

The colored layer 304 may be produced by applying a transmissive color overlay on to a receiver film. Alternatively, a transmissive color gel could be applied to the viewing surface of the front electrode layer shown in FIG. 3.

Figure 4:
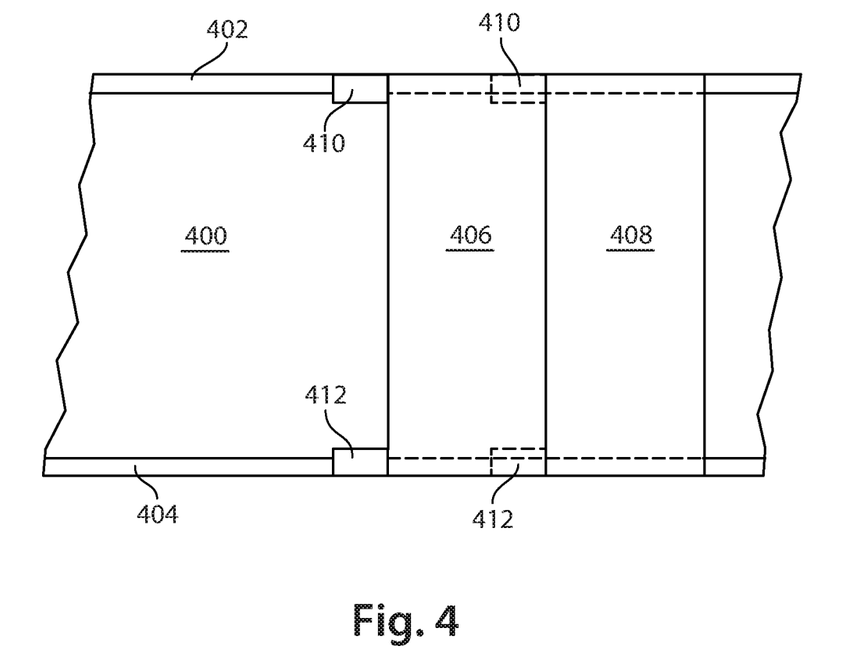
FIG. 4 is a schematic front elevation showing two pieces of the film shown in FIG. 3 applied to a wall provided with two conductors.

FIG. 4 is a front elevation of a wall (generally designated 400) having upper and lower horizontal conductors 402 and 404 mounted thereon; these conductors may be in the form of metal tapes provided on their rear surfaces (as illustrated in FIG. 4) with a pressure-sensitive adhesive by means of which they are attached to the wall. The conductors 402 and 404 are both connected to a display driver (not shown).

Also mounted on the wall 400 are two strips 406, 408 of the film shown in FIG. 3. (It will be appreciated that normally more than two strips would be used, but FIG. 4 is simplified for ease of illustration.) Each strip 406, 408 is provided at its upper end with a rear connector 410 in electrical contact with the rear electrode of the strip. Each rear connector 410 has the form of a tab extending horizontally from the upper part of the left-hand edge (as illustrated in FIG. 4) of the strip 406, 408 and overlying the upper conductor 402. Electrical contact is made between the connector 410 and the conductor 402 by pressing the two into contact, although an electrically conductive adhesive may be used if desired. Similarly, each strip 406, 408 is provided at its lower end with a front connector 412 similar in form to the rear connector 410 but in electrical contact with the front electrode of the strip and with the lower conductor 404. Note that the strip 406 is arranged to cover and thus hide the connectors 410, 412 of strip 408. To prevent accidental short circuits, the front surfaces of the connectors 420, 412 are covered with an insulating layer (not shown). Thus, when a plurality of strips of film are arranged adjacent each other to cover a wall in a manner similar to conventional wallpaper, only one pair of connectors 410, 412 are exposed, and this exposed pair may be covered by a decorative edge molding.

To allow for variations in the positions of the conductors 402, 404 (which need not be along the ends of the strips 406, 408 but can occupy intermediate positions) it may be desirable to provide the strip with multiple sets of connectors 410, 412 spaced from one another. Alternatively, the connectors 410, 412 can have a greater vertical dimension than illustrated in FIG. 4, in which case it may be desirable to trim off excess connector not in contact with the one of the conductors 402, 404. It may be convenient to provide lines of weakness (for example, by rouletting) in the conductors to facilitate removal of excess material.

In some cases, it may be advantageous to provide multiple sets of conductors 402, 404 on the wall, with corresponding multiple sets of connectors 410, 412. Such multiple sets of conductors and connectors can provide useful redundancy to enable the film to continue operating even if one contact fails. Multiple sets of conductors and connectors spaced from one another may also useful to produce interesting visual effects in the film in the manners described in US 2016/0232835 and US 2018/0136532.

Figure 5A:
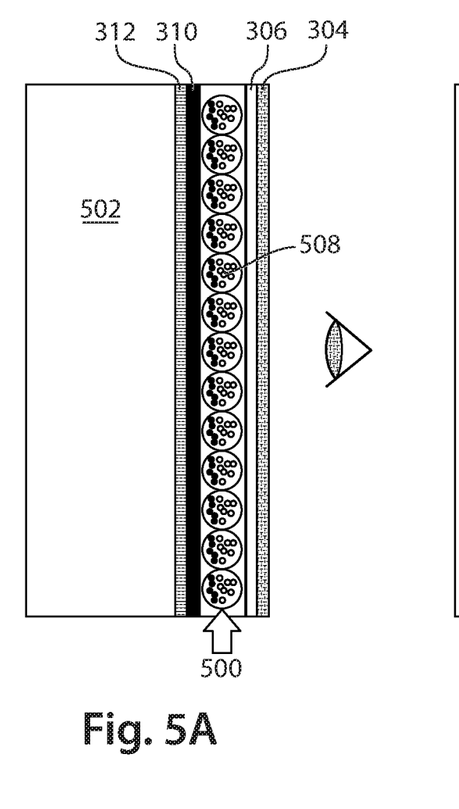
FIGS. 5A and 5B are schematic cross-sections, similar to those of FIG. 3, showing two different optical states of a color film of the present invention applied to a wall.

FIG. 5A is a schematic cross-section, similar to that of FIG. 3 but showing a variable hue film (generally designated 500) of the present invention applied to a wall 502. The film 500 comprises a light-transmissive colored layer 304, a light-transmissive front electrode layer 306, a rear electrode layer 310 and a lamination adhesive layer 312, all of which are essentially identical to the corresponding layers of the film 300 shown in FIG. 3. Prior to being applied to the wall 502, the film 500 also comprised a release sheet (not shown) covering the lamination adhesive layer 312; this release sheet was of course removed to enable the lamination adhesive layer 312 to adhere to the wall 502.

Figure 5B:
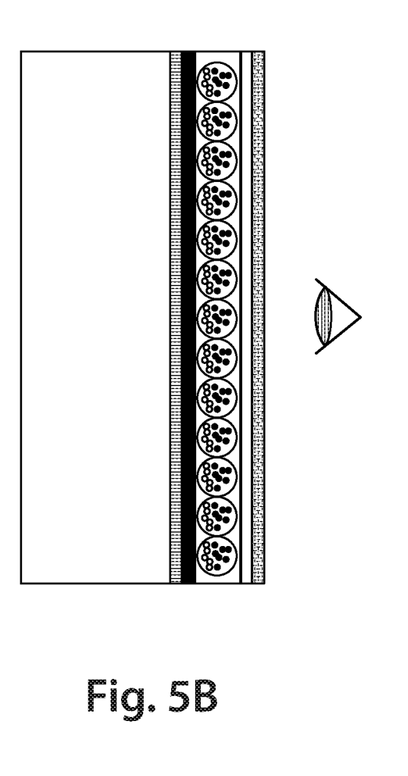

However, the film 500 differs from the film 300 in that its electro-optic layer 508 is an encapsulated electrophoretic medium switchable between a white and a magenta state. FIG. 5A illustrates the film 500 with the electro-optic layer 508 in its white state (as seen from the exposed surface of the film 500). This white state causes the film to display the yellow color of the colored layer 304. FIG. 5B on the other hand illustrates the film 500 with the electro-optic layer 508 in its magenta state. As will be apparent to anyone skilled in color science, the transmissive yellow color of the colored layer 304 absorbs blue light, while the magenta pigment absorbs green light, so the superimposition of the two colors causes the film 500 to display a red color. It will readily be apparent to those skilled in color science that variation of the colors of the colored layer 304 and the pigments in the electro-optic layer 508 will enable a variety of color transitions to be effected by the variable hue films of the present invention. Furthermore, the present invention is not limited to the use of bichromal (two color) electro-optic layers; the aforementioned patents and published applications describe tri- and tetrachromal electrophoretic media capable of being driven by a simple pair of electrodes such as layers 306 and 310 in FIGS. 5A and 5B, and such tri- and tetrachromal electrophoretic media can be used in the films of the present invention to produce complex color transitions.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. A method of forming an image on an architectural surface, the method comprising:
    applying to the architectural surface, in order:
        a rear electrode layer;
        a light-transmissive front electrode layer;
        a photoconductive layer disposed between the front and rear electrode layers;
        an electro-optic layer disposed between the front and rear electrode layers; and
        an intumescent coating on the opposed side of the front electrode layer from the electro-optic layer;
    applying a potential difference between the front and rear electrode layers; and imagewise exposing the front electrode layer to radiation effective to cause a change in the conductivity of the photoconductive layer, thereby causing an imagewise change in the optical state of the electro-optic layer.

2. A method according to claim 1 wherein the photoconductive layer is disposed between the electro-optic layer and the rear electrode layer.

3. A method according to claim 1 wherein the imagewise exposure is effected by projecting an image on to the architectural surface using a projector.

4. A method according to claim 1 wherein the imagewise exposure is effected by providing a plurality of light emitters adjacent the architectural surface and moving the light from the light emitters across the architectural surface.

5. A method according to claim 1 wherein the layers applied to the architectural surface further comprise at least one of:
    (a) an adhesive layer between the front electrode layer and the electro-optic layer;
    (b) an adhesive layer between the electro-optic layer and the rear electrode layer; and
    (c) a protective layer on the opposed side of the front electrode layer from the electro-optic layer.

6. A method according to claim 1 wherein the electro-optic layer is an electrophoretic layer.

7. A method according to claim 1 wherein the intumescent coating comprises a layer of an intumescent material and at least one moisture barrier in contact with at least one surface of the layer of intumescent material, the intumescent material comprising an amine or amide containing compound.

* * * * *